(12) United States Patent
Katori et al.

(10) Patent No.: US 8,176,243 B2
(45) Date of Patent: May 8, 2012

(54) TAPE RECORDING APPARATUS AND METHOD

(75) Inventors: Katsuyoshi Katori, Kawasaki (JP); Yuuji Kibuse, Tokyo (JP); Toshiyuki Shiratori, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 12/001,355

(22) Filed: Dec. 11, 2007

(65) Prior Publication Data

US 2008/0140927 A1 Jun. 12, 2008

(30) Foreign Application Priority Data

Dec. 11, 2006 (JP) ................................ 2006-333777

(51) Int. Cl.
*G06F 13/00* (2006.01)
(52) U.S. Cl. ...................................................... 711/111
(58) Field of Classification Search ........................ None
See application file for complete search history.

(56) References Cited

U.S. PATENT DOCUMENTS

| | | | | |
|---|---|---|---|---|
| 4,775,969 | A * | 10/1988 | Osterlund | 369/53.1 |
| 5,566,032 | A * | 10/1996 | Cleveland et al. | 360/72.2 |
| 6,339,810 | B1 * | 1/2002 | Basham et al. | 711/111 |
| 6,426,842 | B1 * | 7/2002 | Kikuchi | 360/72.2 |
| 6,839,801 | B2 | 1/2005 | Jaquette | |
| 7,568,067 | B1 * | 7/2009 | Mase et al. | 711/111 |
| 2006/0164744 | A1 * | 7/2006 | Greco et al. | 360/55 |

FOREIGN PATENT DOCUMENTS

| | | |
|---|---|---|
| CN | 1584986 A | 2/2005 |
| JP | 2000112831 A | 4/2000 |
| JP | 2005-63444 | 3/2005 |

OTHER PUBLICATIONS

Japanese Office Action for Japanese Patent Application No. 2006-333777 mailed on May 26, 2009, 3 pgs., Japan.
Chinese Office Action issued for Chinese Patent Application No. 2007-101870045 mailed on Aug. 7, 2009, 5 pgs., China.

* cited by examiner

*Primary Examiner* — Hetul Patel
(74) *Attorney, Agent, or Firm* — Kenneth L. Sherman, Esq.; Michael Zarrabian, Esq.; Sherman & Zarrabian LLP

(57) ABSTRACT

A tape recording apparatus is configured for sequentially recording files when receiving a command to write the files from an external host. The tape recording apparatus includes a buffer for temporarily storing the files, a tape on which the files are recorded, a writing device for writing the files stored in the buffer on the tape, and a writing control device for performing control of sequentially writing the files stored in the buffer on the tape one by one. The writing control device memorizes designated delimiter positions when delimiter position designation commands are received from the external host, the delimiter position designation commands designating the delimiter positions of the files to be sequentially written.

18 Claims, 5 Drawing Sheets

TAPE RECORDING APPARATUS AND METHOD

CROSS-REFERENCE TO RELATED APPLICATIONS

This application claims priority of JP 2006-333777, filed Dec. 11, 2006.

BACKGROUND OF THE INVENTION

1. Field of the Invention

The present invention relates generally to a tape recording apparatus, and particularly to a tape recording apparatus and writing control method thereof with improved writing performance.

2. Description of Related Art

FIG. 1 shows a configuration 200 of a tape archive system (also referred to as "a tape backup system") as an example of the configuration of a tape recording system. On a tape cartridge 240 (hereinafter also referred to as "a tape"), which is mounted on the tape drive connected with a computer (a host, a server, or a PC) 210, data recorded on a hard disk (HDD) 220 is archived. The tape cartridge 240 ensures high reliance for a long period of time with low cost, when compared with other recording media such as an HDD, a CD, a DVD and a DRAM.

BRIEF SUMMARY OF THE INVENTION

The invention provides a tape recording apparatus for sequentially recording files when receiving a command to write the files from an external host. In one embodiment, the tape recording apparatus includes a buffer for temporarily storing the files, a tape on which the files are recorded, a writing module for writing the files stored in the buffer on the tape, and a writing control module for performing control of sequentially writing the files stored in the buffer on the tape one by one. The writing control module memorizes designated delimiter positions when commands (delimiter position designation commands) are received from the external host, the commands designating the delimiter positions of the files to be sequentially written.

The writing control module notifies the external host of information on whether or not the files have been written on the tape to the delimiter positions when the delimiter position designation commands are sequentially received, and also when a command (writing position check command) to check up to which delimiter position the files have been written on the tape is received.

The invention also provides a tape recording system, which includes said tape recording apparatus connected with a host. The tape recording system is configured for receiving a command to write the files and delimiter position designation commands for delimiter positions of the files, which are issued by the host.

In one embodiment of the tape recording system, the writing control module memorizes sequence numbers indicating an order of receiving the commands as designated delimiter positions when the position designation commands are sequentially received.

When the position designation commands are sequentially received, and also when a command to check up to which delimiter position the files have been written on the tape (writing position check commands) is received from the external host, the writing control module notifies the external host of information on whether or not the files have been written on the tape up to the delimiter positions.

In response to the writing position check commands, the writing control module notifies the external host of the sequence number indicating the last written delimiter position on the tape as information on whether or not the files have been written on the tape up to the designated delimiter positions.

In response to the writing position check commands, the writing control module notifies the external host of a relative value of the sequence number of the last written delimiter position on the tape, to the last sequence number of the last delimiter position designated by the last command as information on whether or not the files have been written on the tape up to the designated delimiter position.

For a number of the position designation commands, M (a natural number), and the sequence number of the last written delimiter position on the tape, N (a natural number wherein N<M), the writing control module has the sequence number M as indicating the last designated delimiter position, and notifies the external host of N−M as the relative position.

The invention also provides writing control means for a tape recording apparatus for sequentially recording files when receiving a command to write the files. The writing control means is for memorizing the designated delimiter positions when commands to designate delimiter positions of files to be written (delimiter position designation commands) are received.

In one embodiment of the writing control means, when the position designation commands are sequentially received, and also when a command (writing position check commands) to check up to which delimiter position the files have been written on the tape is received from the host, the information on whether or not the files have been written on the tape to the delimiter positions is memorized.

The present invention also provides a writing control method used for a tape recording apparatus for sequentially recording files when receiving a command to write files from an external host. In one embodiment, the writing control method includes temporarily storing the files in a buffer, recording the files on a tape, writing the files stored in the buffer on the tape, sequentially writing the files stored in the buffer on the tape, and memorizing the designated delimiter positions when a command (delimiter position designation command) is received from the external host, the command designating delimiter positions of the files to be sequentially written.

The control method further includes notifying the external host of information on whether or not the files have been written on the tape up to the delimiter positions when a command (writing delimiter position check commands) to check up to which delimiter position the files have been written on the tape is received from the external host.

BRIEF DESCRIPTION OF THE DRAWINGS

PRIOR ART

DETAILED DESCRIPTION OF THE PREFERRED EMBODIMENT

For a more complete understanding of the invention, in the following description reference is made to the accompanying drawings showing certain embodiments of the invention. However, such following embodiments are not intended to limit the scope of claims of the present invention.

Figure 2:
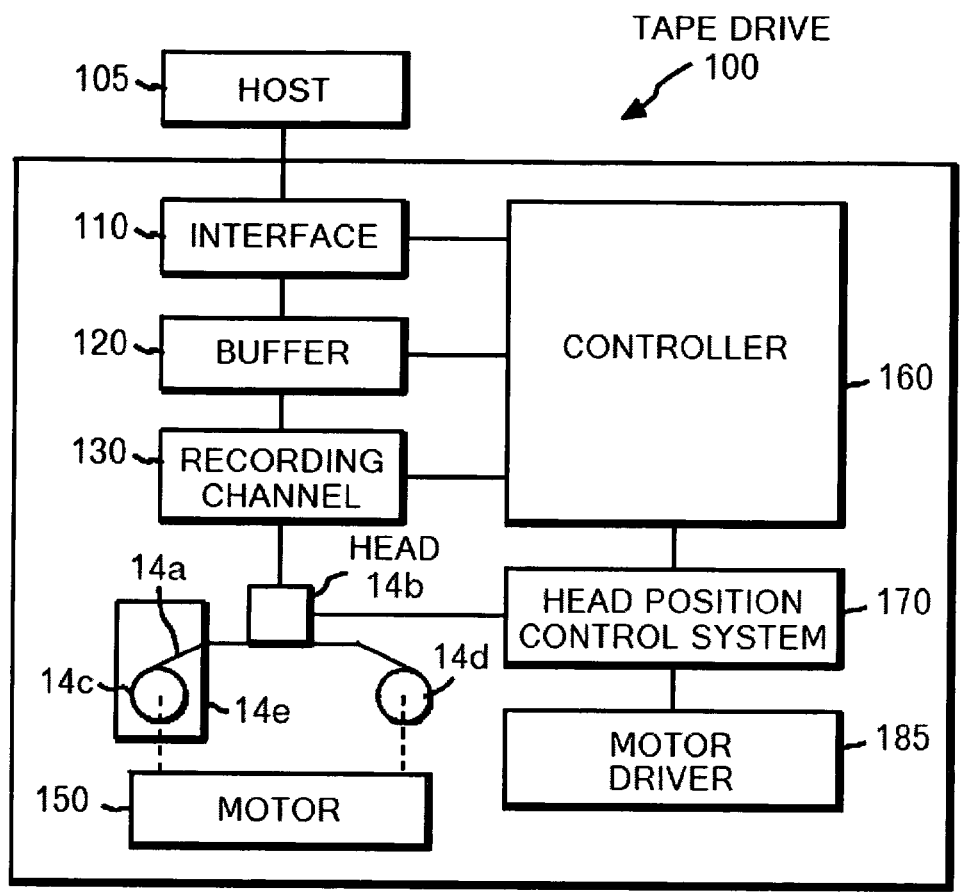
FIG. 2 is a block diagram of a tape drive apparatus.

In one embodiment, the invention provides a tape recording apparatus, such as a tape drive, with an improved writing speed, a writing control of the tape recording apparatus and a writing control method thereof. FIG. 2 shows a block diagram of an example tape drive apparatus 100 (also referred to as a tape drive), in accordance with the invention.

In particular, a function to accept two new commands (hereinafter referred to as "new commands") is implemented in the tape drive. A first command is an instruction for designation delimiter positions (hereinafter referred to as "a delimiter position designation command") for indicating delimiter positions of files to be sequentially written to the tape drive. A second command is an instruction for checking a tape writing position (hereinafter referred to as "a writing position check command") enabling a host to check a delimiter position of the files, to which writing of the file on the tape has been completed. These two new commands are used as a pair.

The tape drive apparatus 100 includes a buffer 120, a recording channel 130, a writing device (writing module) which may comprise a head 14b, a magnetic tape medium 14a, a cartridge 14e, a motor 150, a data writing control device (writing control module) which may comprise a controller 160 and a head position control system 170, and a motor driver 185. The controller 160 receives, through an interface 110, a writing command to write data (or a record), from the host 105 to the buffer 120, and a synchronous command that instructs to write the data of the buffer 120 on the magnetic tape medium 14a. For example, when the communication standard of the interface 110 is a Small Computer System Interface (SCSI), the writing command for writing data or a record from the host 105 is a WRITE command. The synchronous command is a WRITE FILEMARKS 0 (hereinafter abbreviated as "WRITE FM0") command for checking that files temporarily stored (prepared) in the buffer 120 are written on the tape.

The controller 160 controls the tape drive apparatus 100 overall. According to the command received from the host 105, the controller 160 performs control of writing and reading the data on/from the magnetic tape medium 14a. The controller 160 further performs control of the head position control system 170 and the motor driver 185.

The head 14b writes, on the magnetic tape medium 14a, the data or records passed through the recording channel 130. The magnetic tape medium 14a is rolled around reels 14c and 14d, and longitudinally moves, along with rotation thereof, in any one of a direction from the reel 14c to the reel 14d and a direction from the reel 14d to the reel 14c. The cartridge 14e is a container housing the reel 14c, around which the magnetic tape medium 14a is rolled. A container housing the reel 14d may be provided by use of the same cartridge as the cartridge 14e. The motor 150 rotates the reels 14c and 14d.

The host 105 checks that a set of data or records, which are temporarily stored in the buffer 120 by the WRITE command, are properly written as a file on the tape. For this check, a synchronous request (Flush) is made to the tape drive apparatus 100. The data or records written from the host 105 are temporarily stored in the buffer 120, and the synchronous request (Flush) is made by the WRITE FM0 command, so that the data or records are properly written on the tape from the buffer. In general, the synchronous request is made after the WRITE command is issued for the preceding data or records.

Figure 3:
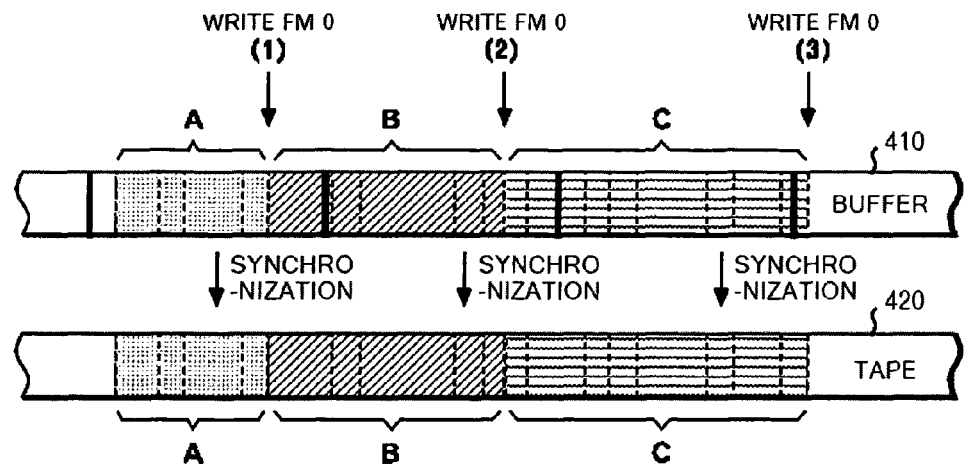
FIG. 3A shows a writing method of writing from a buffer to a tape in the tape drive.
FIG. 3B shows a timing chart of synchronizing operations of the three files to the tape.
Figure 3:
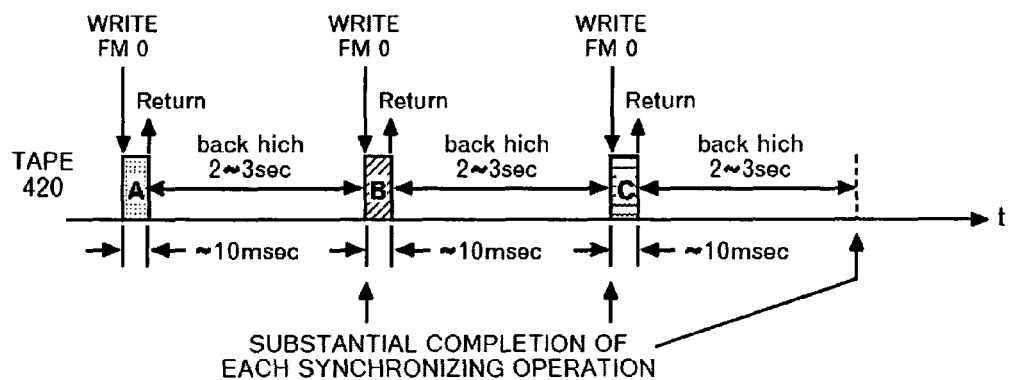

FIG. 3A shows a writing-control method using synchronous requests for three files from a buffer 410 (corresponding to 120 in FIG. 2) in a tape drive to a tape 420 (corresponding to 14a in FIG. 2). In a writing control method of the tape drive, when the amount of a series of records written from the host and thus temporarily stored in the buffer 410 reaches a certain amount, the records are written on the tape at a speed of the tape drive.

The tape drive is capable of performing write and read operations, and hence, when the amount of records stored in the buffer 410 reaches to some extent, writing on the tape 420 starts in a manner independent of the WRITE command and synchronous command from the host.

In FIG. 3A, synchronous requests are issued in order to write the three files A, B and C on the tape 420 which is mounted on the tape drive. An application of the host recognizes each of the files A, B and C having content as a set of records having the content. To check that the files are properly written on the tape 420, the application of the host issues synchronous requests (WRITE FM0: when received this command, the tape drive performs a Flush operation) at delimiter positions of (1), (2) and (3).

When receiving a synchronous request for each of the files A, B and C, the tape drive notifies the application of the host that the files A, B and C designated by the synchronous requests are written on the tape. For example, when synchronization of the file A has been completed, the application of the host executes the WRITE command for the next file B, and the file B is temporarily stored in the buffer 420.

FIG. 3B shows a timing chart of synchronizing operations of the three files to the tape 420. Backhitches start at the time when the synchronizing operations of the three files A, B and C to the tape 420 are completed. For example, in a case where a synchronous request is made for the file B following the completion of synchronizing the file A, the start of the synchronizing operation of the file B is delayed since a backhitch is intervened in the tape drive. This means that, in a case where synchronous requests are made for all the files, writing performance overall is reduced.

Even after the writing of the file A on the tape 420 is completed, the tape 420 moves forward in relation to the writing head. In a case where the synchronous request for the next file B is made without stopping the tape 420, long wasted space is caused in a recording region between the file A being written on the tape by the preceding synchronous request and the file B to be written. To minimize this wasted recording capacity, the tape drive sets an interval between the files (records) to be written in a longitudinal direction of the tape medium to minimum by the backhitch operation.

The backhitch is executed by the operation of motor drive. Specifically, the tape medium is stopped once with its traveling speed is reduced, and then reversely moves. After the end position of the tape medium of a file lastly written passes by the writing head, the tape medium is again stopped once with its traveling speed reduced, and then accelerates in the forward direction to return to a position to be written, thereby positioning the end position of the last file. In a tape drive (LTO, 3529, and the like) manufactured by IBM, it takes approximately 2.5 to 3 seconds for a backhitch operation of a tape drive caused for each synchronous request. The writing of data on the tape associated with a number of synchronous requests has been a cause to reduce the writing performance of transfer data from the host since the backhitch operation is frequently performed.

FIG. 3B further shows that although it depends on the size of one file, a writing speed of the file on the tape is approximately several 10 msec. One backhitch operation adds, to a time for one writing operation, a time (approximately 3 seconds) on the order of 100 times or more longer than a writing speed at which a file is written to a tape. When completing the synchronization of the file A, the tape drive needs to perform the backhitch operation. Hence, the tape drive cannot accept the writing to the tape even when the next file B can be stored in the buffer 410. FIG. 3B shows that the writing to the tape 420 is substantially suspended during the backhitch (2 to 3 seconds) even when the file B is prepared in the buffer 410.

In a case where three synchronous requests are respectively issued for the files A, B and C of FIGS. 3A and 3B, the writing performance is reduced for approximately 9 seconds at maximum due to the three times of the backhitches. In an example where 100 files are to be written on a tape, approximately 300 seconds at least of extra writing time are required, in addition to the time originally required for writing the data, just for the synchronizing operation.

Figure 4:
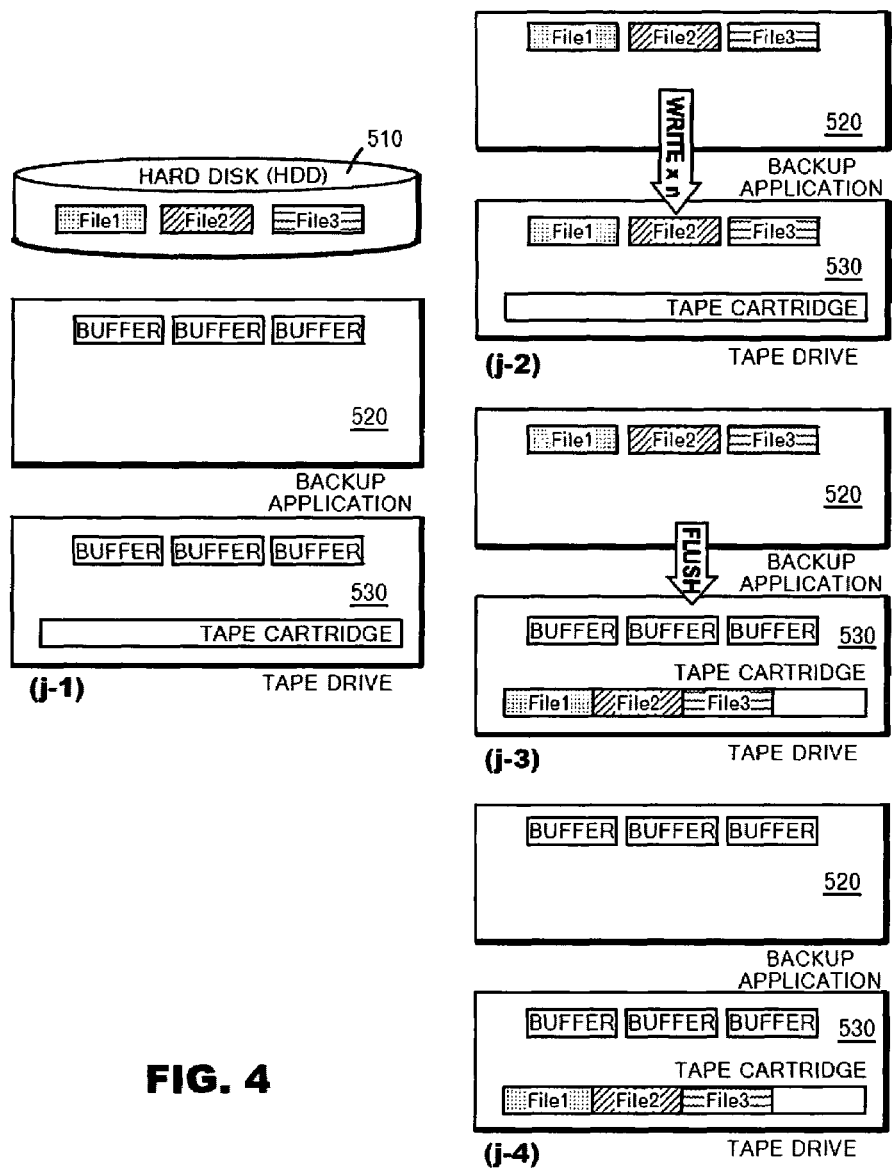
FIG. 4 shows a writing sequence (j-1) to (j-4) for collectively performing synchronizing operations (that is, backhitches) of files to reduce time required for the synchronizing operations.

FIG. 4 shows a writing sequence (j-1) to (j-4) where the synchronizing operations of the files are collectively performed to reduce the time required for the synchronizing operations (that is, the backhitches) as much as possible. This writing sequence does not make a synchronous request for each of files 1, 2 and 3, which is meaningful for an application, as a conventional writing sequence does. This is a writing method in which at the stage where all the files 1, 2 and 3 are written in a buffer of a tape drive 530, the application finally issues a synchronous request (Flush) only once. The writing sequence (j-1) to (j-4) is described in more detail below.

Figure 1:
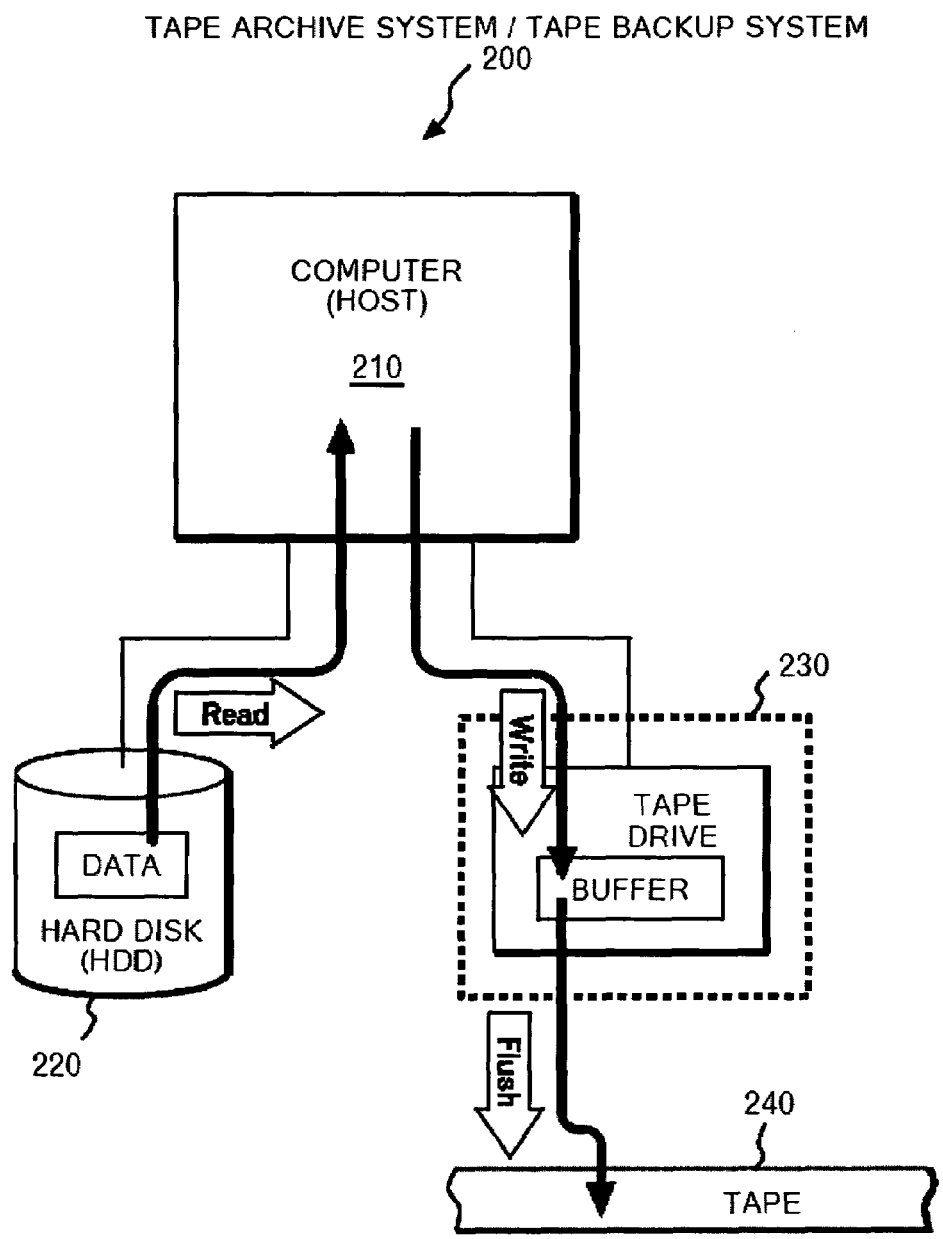
FIG. 1 is a block diagram of a conventional data archive system.

(j-1): is a first state where a backup application 520 residing in the computer 210 writes three files 1, 2 and 3 recorded in an HDD 510 (corresponding to 220 in FIG. 1), on a tape (corresponding to 240 in FIG. 1) of a tape drive 530 (corresponding to 230 in FIG. 1).

In the following (j-2) to (j-4) sequence, the HDD on which the three files are recorded is in common, and thus the description thereof will be omitted.

(j-2): the backup application 520 stores the files 1, 2 and 3 in the buffer of the tape drive 530 by WRITE commands.

(j-3): the backup application 520 makes a synchronous request (Flush) once to the tape drive by the WRITE FM0 for the three files 1, 2 and 3 stored in the buffer.

(j-4): is a state after making only one synchronous request for writing the three files, which are meaningful for the backup application, on the tape.

This writing method can limit the time loss to only one backhitch, the performance problem of the above-described writing method is reduced in that the reduction of writing performance can be minimized.

For this writing method, because synchronization is performed collectively, responses to synchronization from the files are delayed, except for the file which is lastly written to the tape drive in terms of individual files. In addition, it cannot be ensured that the file which is firstly written to the tape drive is written on the tape until the synchronization is completed after the writing of the last file.

In a case where an error of the synchronizing operation is detected during the writing of any one of the files 1, 2 and 3 on the tape, the tape drive cannot notify the application that the writing of which file was in progress when the error occurred. Accordingly, it is necessary to perform rewriting for all the files in the group of files (files 1, 2 and 3) to which the writing have been instructed. In terms of the backup application, because it is necessary to rewrite all the files, the cause to reduce the writing performance cannot be excluded yet even when this writing control method is used.

U.S. Pat. No. 6,839,801, the disclosure of which is hereby incorporated by reference in its entirety, discloses a technique that data to be written from the host is temporarily written on a non-volatile storage. Command completion is immediately returned thereafter in order to prevent the delay of the response performance (the time for the backhitch operation) for the synchronous request command from the host. An object of this technique is to suppress the reduction of synchronous writing performance and to improve writing performance. With this technique, for the synchronous request from the host, a response is returned to the data having a high possibility that writing to the tape has been already completed by a new command of "DEFERRED SYNC". The technique also provides means for waiting until the completion of writing, when the writing of the data on the tape has not been actually completed yet, and thus the synchronization is not completely reduced. In addition, it is not a technique which cheaply uses a tape drive in that a controller device provided with a DEFERRED SYNC LOGIC and non-volatile memory are needed.

The writing control of U.S. Pat. No. 6,839,801 contributes to the improvement of writing performance in that the number of performing the synchronizing operations, which are a cause of reducing the performance, is cut down. However, when the writing on the tape is performed in the tape drive without using synchronous requests of files, it is impossible to specify to which delimiter position of the files writing of the file on the tape has been surely completed.

In the following, a preferred embodiment of the invention is described, which overcomes the drawbacks discussed above with respect to U.S. Pat. No. 6,839,801.

In the flowing description, "a file delimiter position" and "a delimiter position of a file" mean a delimiter position of a file which is designated by an application of a host. It is to be noted that these "positions" do not mean addresses of buffers of files stored in the buffers in the tape drive. Each file means that records written from the host is delimited by the application (host). The tape drive simply performs sequential writing of the records, and the tape drive per se cannot perform writing by recognizing each file.

The application of the host manages a set of records having meaning for the application. The application intends to perform writing of files on a tape by writing records, but the tape drive per se cannot recognize the files. Accordingly, in accordance with an embodiment of the invention, the tape drive is informed of delimiter positions of files by new commands from the application.

The new commands include two prim functions (for example, a "first new command" and a "second new command").

1. The first new command is sequentially issued by the application at delimiter positions ("file delimiter positions") of files (a set of records) at the time of writing the records to let the tape drive to know file delimiter positions. The tape drive causes the application to memorize the number of the orders of receiving the first new commands as each of the file delimiter positions.

2. The second new command is issued by the application to know to which delimiter position of the file designated by the first new command the file has been written on the tape. The tape drive returns to the application (host) information of the delimiter position of the last file (the tape writing delimiter position) which has been completely written on the tape in a case where the delimiters are memorized by the first new command. The writing operation of the tape drive is performed on the tape by a sequential writing method. By having this sequential characteristic, even when delimiter positions are designated in advance by the first new command, and even when tape writing delimiter positions are present in each of the delimiter positions, the tape drive is only needed to notify the host of only the last tape writing delimiter position.

For example, suppose a case where, when delimiter positions of the files are designated for the tape drive by the first new commands, the files have been written on the tape to the delimiter position which has been memorized N times before counted from "the file delimiter position" which has been already received by the buffer. In other words, the files have not yet been written on the tape to the delimiter position which has been memorized N−1 times before counted from "the file delimiter position" which has been already received by the buffer. In this case, the tape drive which has received the second new command from the host returns to the host a relative position N from "the file delimiter position already received by the buffer" as "the file delimiter position already written on the tape". If the last file has already been written on the tape, "the file delimiter position already written on the tape" and "the file delimiter position already received by the buffer" are the same. In this case, the tape drive returns to the host "the file delimiter position already written on the tape" as the relative position 0 from "the file delimiter position already received by the buffer" in response to the second new command.

In addition, when a permanent error due to a medium defect of the tape, and the like, is detected, the tape drive returns CHECK CONDITION status in response to the new command made immediately the detection of the error. The tape drive receives the first new command designating the file delimiter position to write the records from the host and to let the tape drive know the delimiter position of the file. When the second new command is received from the host, the tape drive returns "the file delimiter position already written" indicating that the writing on the tape has been surely completed in the delimiter positions designated at each time. As a result, it is understood that the application of the host needs to perform rewriting from the delimiter position of the file, following "the file delimiter position" N which has already been written on the tape in which the file has already been written surely by issuing the second new command.

Figure 5:
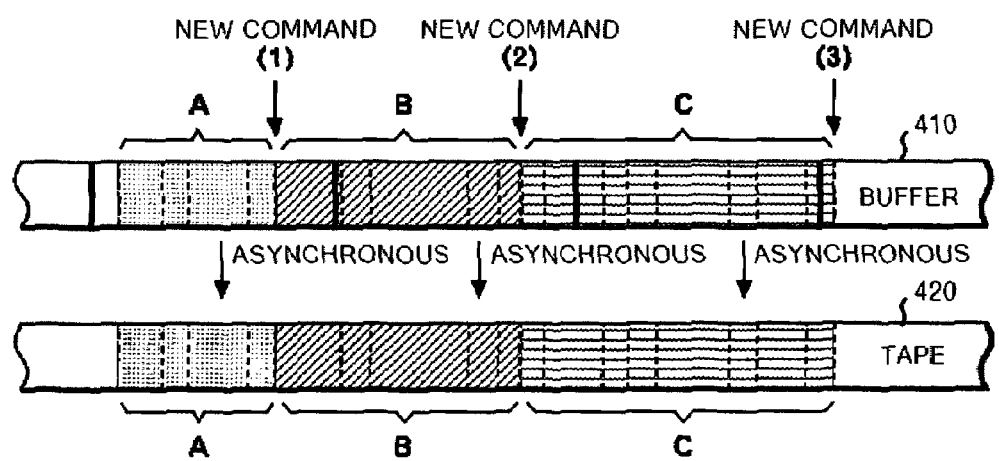
FIG. 5 illustrates a preferred writing method according to an embodiment of the invention.

FIG. 5 shows one embodiment of a data writing control method in the tape drive according to the present invention. FIG. 5 illustrates a state that records (distinguished by dotted lines) written by WRITE commands from the application of the host are stored in a buffer 410, and then written on a tape 420. The writing control of the present invention issues new commands, instead of synchronous request commands WRITE FM0 of FIGS. 3A and 3B, at the timing of the delimiter positions (1), (2) and (3) of the files A, B and C having meaning for the application. The tape drive memorizes the delimiter positions (1), (2) and (3) of files A, B and C, which are stored in the buffer 410 according to the order that the drive receives the new commands (sequence No.: 1, 2 and 3) to perform management of delimiter positions. The tape drive notifies the host whether the files A, B and C have been written on the tape to the designated delimiter positions (1), (2) and (3) by notifying the host of the order designating "the tape writing delimiter positions" (1, 2 and 3). The delimiter positions (1), (2) and (3) may be memorized by using management numbers (for example, addresses, blocks and segments) of the buffer 410 that the drive can obtain. However, the tape drive uses the sequential writing method. Accordingly, it is sufficient for the application to obtain the order of writing the files A, B and C, and the application does not require detailed values such as addresses of the buffer. However, in the tape drive, other than the order of receiving the new commands, or together with the order, the management and memorization of the file positions may be performed by using the positions of the buffer (for example, address number of the buffer, segment number of the buffer, or block number of the buffer).

In the writing control in accordance with embodiments of the invention, the writing from the buffer 410 to the tape 420 is not performed by the synchronous requests from the application of the host. The "asynchronous" writing is performed in the sense that the drive can perform writing on the tape at its own timing. The writing control of the present invention depends on the drive timing of the normal sequential writing on the tape of the tape drive, so that the reduction of writing performance can be avoided as much as possible. The tape drive starts sequentially writing the files (records) stored in the buffer 410 at a writing speed of its own. The application issues new commands independently from each WRITE command. The tape drive keeps information on whether the files A, B and C whose delimiter positions are designated by the new commands are written on the tape, and the information is conveyed to the application.

FIG. 5 also shows commands to designate delimiters of the files A, B and C in the tape drive at the times of (1), (2) and (3) so as to check up to which delimiter position the files have been written on the tape (a function of tape writing position check command) is received. In a case where it is assumed that the new command issued from the application at the timing (3) is the tape writing check command designating the file C, when the file C is not written on the tape 420 at that time, then the above state is notified. In a case where the file A has been already written, but the files B and C have not been written yet, −2 may be returned as the relative position of the file A from the file C in response to the new command. The application is notified of this relative position −2, and hence finds out that the writing on the tape has been completed to the file A which is in the relative position −2 from the position of the last file C of the designated files A, B and C.

In this embodiment, the new commands have both functions of the first new command (the delimiter position designation command) and the second new command (the writing position check command). The new commands notify the tape drive of the delimiter positions of the files to be sequentially written (the function of the first new command), and at the same time, notify the host of information to which delimiter position of the file designated by another new command therebefore has been written on the tape (the function of the second new command). As described above, it is possible to execute the two functions by different commands. It is also included in the scope of the present invention that the first new command designates the file delimiter positions, and that the second new command enables to receive the notification to which designated delimiter position of file the file has been written on the tape.

The writing control method to the tape in the sequential recording device such as the tape drive according to the embodiment of the present invention has been disclosed above.

In accordance with embodiments of the invention, when new commands are received from the host, the tape drive can make synchronous requests (backhitch operations) unneeded for writing files by notifying whether or not the designated file has already been written on the tape, so that the improvement of writing performance can be achieved.

In addition, in accordance with embodiments of the invention, because the delimiter position of the file which has already been written on the tape can be checked by the new commands for a writing error, rewriting the tape is possible from the file which has not been written yet. As a result, the performance of writing error processing can be improved.

Furthermore, in accordance with embodiments of the invention, the writing of each file can be checked, by using the new commands, without accompanying the backhitch operation at each time. Accordingly, the application can perform file processing of the files which have already been written on the tape in parallel with other operations without waiting for checking the writing of the following files on the tape. Thus, the writing performance of the tape drive as a whole, including the host, can be improved.

In accordance with embodiments of the invention, the tape drive receives the new commands issued by the host, and notifies the host to which delimiter position the file have been written on the tape, so that synchronous requests can be made unneeded. Consequently, it is possible to improve the writing performance of files.

It is obvious for those skilled in the art that various modifications and improvements of the above embodiment can be made, and embodiments to which the modifications and improvements are made are also included in the technical scope of the present invention.

Although the preferred embodiment of the present invention has been described in detail, it should be understood that various changes, substitutions and alternations can be made therein without departing from spirit and scope of the inventions as defined by the appended claims.

What is claimed is:

1. A tape recording apparatus, for sequentially recording files when receiving a command to write the files from an external host, comprising:
    a buffer for temporarily storing the files;
    a tape on which the files are recorded;
    a writing device for writing the files stored in the buffer on the tape; and
    a writing control device for performing control of sequentially writing the files stored in the buffer on the tape one by one, wherein
    the writing control device memorizes designated delimiter positions when delimiter position designation commands are received from the external host, the delimiter position designation commands designating the delimiter positions of the files to be sequentially written; and
    upon the writing control device receiving a writing position check command from the external host after a last one of the delimiter position designation commands, the writing control device notifies the external host of information comprising which delimiter position the files have been written on the tape,
    wherein for a number of the position designation commands being M, wherein M is a natural number and the last designated delimiter position, and a sequence number of a last written delimiter position on the tape being N, wherein N is a natural number and N<M, the writing control device uses M as indicating the last designated delimiter position, and the information is the last written designated delimiter position N for the last designated delimiter position M, and the information is N–M as the relative position.

2. The tape recording apparatus according to claim 1, wherein, when the position designation commands are sequentially received, the writing control device memorizes a number indicating a sequence of the receiving command as the designated delimiter position each time the command is received.

3. The tape recording apparatus according to claim 1, wherein, when the delimiter position designation commands are sequentially received, and also when a writing position check command to check up to which delimiter position the files have been written on the tape is received, the writing control device notifies the external host of information on whether or not the files have been written on the tape to the delimiter positions.

4. The tape recording apparatus according to claim 3, wherein, in response to the writing position check command, the writing control device notifies the external host of a sequence number indicating a last written delimiter position among the designated delimiter positions to which a file is lastly written on the tape, as information on whether or not the files have been written on the tape up to the last designated delimiter position.

5. The tape recording apparatus according to claim 3, wherein, in response to the writing position check command, the writing control device notifies the external host of the value of a sequence number of the last written delimiter position on the tape, to the last sequence number of delimiter positions designated by the last delimiter position designation command, as information on whether or not the files have been written on the tape up to the last designated delimiter position.

6. The tape recording apparatus according to claim 1, wherein responsive to the writing position check command the external host receives the last written designated delimiter position N and the last designated delimiter position M.

7. The tape recording apparatus according to claim 1, wherein:
    the external host utilizes the information sent by the writing control device to determine whether or not the files have been written on the tape to the designated delimiter positions; and
    the writing control device memorizes designated delimiter positions in a memory buffer external to the tape.

8. The apparatus of claim 1, wherein:
    the writing control device further notifies the external host of whether or not the files have been written on the tape by sending the external host a delimiter position of a file last written on the tape relative to said last designated delimiter position memorized by the control device.

9. A tape recording system, comprising:
    a host; and
    a tape recording apparatus connected with the host and configured for sequentially recording files when receiving a command to write the files from the host, the tape recording apparatus comprising:
        a buffer for temporarily storing the files;
        a tape on which the files are recorded;
        a writing device for writing the files stored in the buffer on the tape; and
        a writing control device for performing control of sequentially writing the files stored in the buffer on the tape one by one, wherein
        the writing control device memorizes designated delimiter positions when delimiter position designation commands are received from the external host, the delimiter position designation commands designating the delimiter positions of the files to be sequentially written, and the writing control device notifies the external host of information comprising which delimiter position the files have been written on the tape upon receiving a writing position check command after a last one of the delimiter position designation commands, wherein the tape recording system receives a command issued by the host to write the files, and a delimiter position designation commands for delimiter positions of the files, and for a number of the position designation commands being M, wherein M is a natural number and the last designated delimiter position, and a sequence number of a last written delimiter position on the tape being N, wherein N is a natural number and N<M, the writing control device uses M as indicating the last designated delimiter position, and the information is the last written designated delimiter position N for the last designated delimiter position M, and the information is N−M as the relative position.

10. The tape recording system according to claim 9, wherein the writing control device memorizes sequence numbers indicating an order of receiving the commands as the designated delimiter positions when the position designation commands are sequentially received.

11. The tape recording system according to claim 9, wherein, when the position designation commands are sequentially received, and also when a writing position check command to check up to which delimiter position the files have been written on the tape is received from the host, the writing control device notifies the host of information on whether or not the files have been written on the tape up to the delimiter positions.

12. The tape recording system according to claim 11, wherein, in response to the writing position check command, the writing control device notifies the host of a sequence number indicating the last written delimiter position on the tape as information on whether or not the files have been written on the tape up to the designated delimiter position.

13. The tape recording system according to claim 11, wherein, in response to the writing position check command, the writing control device notifies the host of a relative value of a sequence number of the last written delimiter position on the tape, to the last sequence number of the last delimiter position designated by the last command as information on whether or not the files have been written on the tape up to the designated delimiter position.

14. The tape recording system according to claim 9, wherein the tape is loadable to and unloadable from the tape recording apparatus.

15. A writing control means, wherein the writing control means is used for a tape recording apparatus for sequentially recording files when receiving a command from a host to write the files, and wherein, when delimiter position designation commands to designate delimiter positions of files to be written are received, the designated delimiter positions are memorized, and the writing control means sends the host information comprising which delimiter position the files have been written on a tape upon the writing control means receiving a writing position check command after a last one of the delimiter position designation commands, wherein for a number of the position designation commands being M, wherein M is a natural number and the last designated delimiter position, and a sequence number of a last written delimiter position on the tape being N, wherein N is a natural number and N<M, the writing control device uses M as indicating the last designated delimiter position, and the information is the last written designated delimiter position N for the last designated delimiter position M, and the information is N−M as the relative position.

16. The writing control means according to claim 15, wherein, when the position designation commands are received, and also when a writing position check command, which is used to check up to which delimiter position the files have been written on the tape, is received from the host, the information on whether or not the files have been written on the tape up to the delimiter position is memorized.

17. A writing control method used for a tape recording apparatus for sequentially recording files when receiving a command to write files from an external host, the writing control method comprising:

temporarily storing the files in a buffer;
recording the files on a tape;
writing the files stored in the buffer on the tape;
sequentially writing the files stored in the buffer on the tape one by one; and
memorizing the designated delimiter position when a delimiter position designation command is received from the external host, the command designating delimiter position of the files to be sequentially written, wherein, for a number of the position designation commands being M, wherein M is a natural number, and a sequence number of a last written delimiter position on the tape being N, wherein N is a natural number and N<M, a writing control means uses M as indicating the last designated delimiter position, and the external host receives the value of N−M as the relative position.

18. The writing control method according to claim 17, further comprising notifying the external host of information on whether or not the files have been written on the tape up to the delimiter position when a writing delimiter position check command, which is used to check up to which delimiter position the files have been written on the tape, is received from the external host.

* * * * *